United States Patent
Hamanaka et al.

(10) Patent No.: US 6,912,091 B2
(45) Date of Patent: Jun. 28, 2005

(54) METHOD OF DESIGNING COLLIMATOR ARRAY DEVICE AND COLLIMATOR ARRAY DEVICE MANUFACTURED THEREBY

(75) Inventors: Kenjiro Hamanaka, Osaka (JP); Satoshi Taniguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 779 days.

(21) Appl. No.: 09/784,483

(22) Filed: Feb. 15, 2001

(65) Prior Publication Data

US 2001/0024548 A1 Sep. 27, 2001

(30) Foreign Application Priority Data

Feb. 17, 2000 (JP) ........................................ 2000-038952
Feb. 14, 2001 (JP) ........................................ 2001-036764

(51) Int. Cl.[7] ............................ G02B 27/30; G02B 7/02; G02B 6/26; G02B 6/42; G02B 6/32
(52) U.S. Cl. ........................ 359/641; 359/820; 385/16; 385/33
(58) Field of Search ................................. 359/641, 820, 359/288, 619; 385/14–18, 27, 33, 39, 119, 24

(56) References Cited

U.S. PATENT DOCUMENTS

| | | | |
|---|---|---|---|
| 5,202,567 A | 4/1993 | Hamanaka | 250/551 |
| 5,337,186 A | 8/1994 | Oikawa et al. | 359/628 |
| 5,362,961 A | 11/1994 | Hamanaka | 250/216 |
| 5,500,523 A | 3/1996 | Hamanaka | 250/216 |
| 5,990,992 A | 11/1999 | Hamanaka et al. | 349/95 |
| 6,587,618 B2 * | 7/2003 | Raguin et al. | 385/33 |

OTHER PUBLICATIONS

Kawano, "Basis and Application of Optical Coupling System", chapters 3 & 4, pp. 29–103, published by GEN-DAIKOGAKUSHA.

* cited by examiner

Primary Examiner—Hung Xuan Dang
Assistant Examiner—Joseph Martinez
(74) Attorney, Agent, or Firm—Merchant & Gould P.C.

(57) ABSTRACT

According to the present invention, there is provided a method of designing a collimator array device which enables reduction of the insertion loss because of the variation of the optical length. When the beam waist is positioned at the intermediate position between the emitting side planar microlens and the receiving side planar microlens (d1=L/2), the distance d0 between the emitting side fiber array and the emitting side planar microlens can be used as the distance between the receiving side fiber array and the receiving side planar microlens, and thereby the design of the collimator array device can be simplified. The distance d0 for satisfying d1=L/2 is calculated and two values d0-2 and d0-4 are obtained. By selecting the smaller value d0-2, it is possible to reduce the insertion loss because of the shift at the time of coupling.

12 Claims, 5 Drawing Sheets

METHOD OF DESIGNING COLLIMATOR ARRAY DEVICE AND COLLIMATOR ARRAY DEVICE MANUFACTURED THEREBY

BACKGROUND OF THE INVENTION

1. Field of the Invention

The present invention relates to a method of designing a collimator array device which is used as an optical path changing switch module, an optical demultiplexing filter module, or the like, in an optical communication system, and a collimator array device manufactured by the method.

In practice, the above-mentioned module is obtained by combining a collimator array device and an optical switch array, an optical demultiplexing filter, or the like. However, in the present application, the whole device is referred to as a collimator array device.

2. Description of the Related Art

A general collimator array device (four by four optical switch modules) is shown in FIGS. 1 and 2. In FIG. 1, reference mark 1 indicates an emitting side fiber array. Reference mark 2 indicates an emitting side planar microlens. Reference mark 3 indicates an optical switch array. Reference mark 4 indicates a receiving side microlens. Reference mark 5 indicates a receiving side fiber array. The emitting side fiber array 1 and the receiving side fiber array 5 are respectively formed by installing a plurality of single mode optical fibers 1a and 5a between two sheets of silicon substrates 6a and 6b. Lenses 2a and 4a, having diameters of about 250 μm, are respectively formed in the emitting side planar microlens 2 and the receiving side microlens 4. Mirrors 3a are provided per a pixel in an optical switch array 3.

Mirror 3a is made to reflect or transmit light by inserting the mirror of a minute size in the optical path or displacing therefrom, or by electrically varying the refractive index of the material for the front and the back of the reflection surface. Therefore, the channel can be changed between the emitting side fiber array 1 and the receiving side fiber array 5 by combining the reflection and the transmission of each of the mirrors 3a, arranged 4 by 4, of the optical switch array 3.

The laser beam emitted from the end surface of the single mode optical fiber 1a installed in the emitting side fiber array 1 is collimated by the lens 2a formed in the emitting side planar microlens 2. The optical path of the collimated laser beam is deviated by the optical switch array 3, and thereafter, the laser beam is converged by the lens 4a formed in the receiving side microlens 4. The converged laser beam is made incident upon the single mode optical fiber 5a installed in the receiving side fiber array 5.

In FIG. 1, by giving predetermined mirrors 3a to the optical path, the laser beam emitted from the optical fiber A1 is made incident upon the optical fiber B4, the laser beam emitted from the optical fiber A2 is made incident upon the optical fiber B2, the laser beam emitted from the optical fiber A3 is made incident upon the optical fiber B3, and the laser beam emitted from the optical fiber A4 is made incident upon the optical fiber B1.

A laser beam is Gaussian beam the intensity of which is large in the center portion and small in the periphery portion.

The feature of Gaussian beam is shown in FIG. 3. While the light emitted from the emitting side optical fiber 1a side is collimated by the emitting side lens 2a, converged by the receiving side lens 4a, and made incident upon the receiving side optical fiber 5a, the collimated light is not parallel, i.e., it has a beam waist of 2W1 width in the intermediate portion. In addition, it does not converge upon one point (focal point).

In order to reduce the insertion loss at the receiving side, it is important that the end surface of the receiving side optical fiber 5a be adjusted to accurately coincide with the beam waist position of the laser beam emitted from the receiving side lens 4a and that the mode field diameter of the receiving side optical fiber 5a and the width 2W2 of the beam waist of the laser beam incident thereupon be adjusted to coincide (coupling).

In order to accurately conduct such a coupling, it is necessary that the beam waist of the laser beam emitted from the lens 2a be positioned at half of the distance between the emitting side lens 2a and the receiving side lens 4a, i.e., the optical length L. In other words, it is necessary that the distance d1 between the end surface of the emitting side planar microlens and the beam waist be equal to L/2.

In a case where the optical path of a laser beam is deviated by an optical functional element such as an optical switch array or the like, the optical length L from the emitting side planar microlens through the receiving side planar microlens is varied. For example, in FIG. 1, if one edge of a pixel of the optical switch array is set at 1 mm (therefore, one edge of the array is 4 mm), and the distance between each of the emitting side planar microlens and the receiving side planar microlens and the optical switch array is set at 2 mm, the optical length of the laser beam emitted from the optical fiber A1 and incident upon the optical fiber B4 is 11 mm (8 mm+3 mm), which is the largest, and the optical length of the laser beam emitted from the optical fiber A4 and incident upon the optical fiber B1 is 5 mm (8 mm−3 mm) which is the smallest. The standard value (8 mm) indicates the mean length in this case.

As shown in FIG. 3, the laser beam passing from the emitting side lens 2a through the receiving side lens 4a has a beam waist. The position of the beam waist is determined by the distance d0 between the end surface of the emitting side optical fiber 1a and the emitting side lens 2a. Therefore, if the optical length L is different from the condition shown in FIG. 3, i.e., the position of the receiving side lens 4a is shifted to the left side or the right side in FIG. 3, the position of the beam waist 2W2 of the laser beam emitted from the receiving side lens 4a is varied, the position of the beam waist 2W2 is shifted from the end surface of the receiving side optical fiber 5a, and thereby the insertion loss is increased.

Further, if the materials for the fiber arrays 1, 5 and the planar microlenses 2, 4 are different, the linear expansivities thereof are also different. Therefore, in such a case, if thermal variation occurs, the core of the optical fiber is shifted from the center of the lens.

SUMMARY OF THE INVENTION

As mentioned above, when an optical functional array module is manufactured by forming a collimator optical system comprised of a pair of fiber arrays and a pair of planar microlenses and inserting various optical functional elements into the collimated optical path, the optical length is shifted or varied with regards to the ideal value depending on the operation condition or the insertion position of the optical functional element, or the accuracy of fixing the components. The first purpose of the present invention is to provide an optimum designing method with regards to a collimator array optical system which is subject to the variation of the optical length.

The problem that the optical length is shifted or varied with regards to the ideal value depending on the operation condition or the insertion position of the optical functional element, or the accuracy of fixing the components occurs to an optical system using a general convergent lens (a lens having positive power) as well as an optical system using a planar microlens. Therefore, another purpose of the present invention is to provide an optimum designing method with regards to an optical system using a general convergent lens.

In order to solve the problem of the variation of the optical path, according to the present invention, there is provided a method of designing a collimator array device having an optical functional element, comprising the steps of: calculating a mean value La of the optical length L which is varied depending on the combination of an emitting side optical fiber and a receiving side optical fiber, and obtaining the distance d0 between the emitting side fiber array and an emitting side lens in which the distance d1 from the emitting side lens through the beam waist of the laser beam collimated by the emitting side lens is equal to La/2.

There are two values with regards to the distance d0 between the emitting side fiber array and the emitting side lens in which the distance d1 from the emitting side lens through the beam waist of the laser beam is equal to La/2. The inventors of the present invention have acknowledged that the smaller value should be selected to reduce the insertion loss because of the variation of the optical length.

The emitting side lens and the receiving side lens are not limited to a planar microlens. A homogenous lens such as a spherical lens; an aspherical lens or the like; a graded index lens such as a graded index in radical direction rod lens, a graded index in axis direction spherical lens, or the like; and a grating lens such as Fresnel lens or the like may be used.

The optical functional element varies the optical length L of the laser beam depending on the operation condition thereof. Specifically, an optical switch array or (an) optical demultiplexing filter(s) for changing the channel between the emitting side fiber array and the receiving side fiber array can be listed as examples of the optical functional element.

Also, in order to achieve the second purpose of the present invention that the shift due to the thermal expansion be minimized, one edge or two adjacent edges of the emitting side planar microlens and the receiving side planar microlens are fixed, can the emitting side planar microlens and the receiving side planar microlens can expand or shrink in the same direction with regards to the optical axis in a case where thermal variation occurs. However, the other portions are not fixed.

DETAILED DESCRIPTION OF THE PREFERRED EMBODIMENTS

Figure 1:
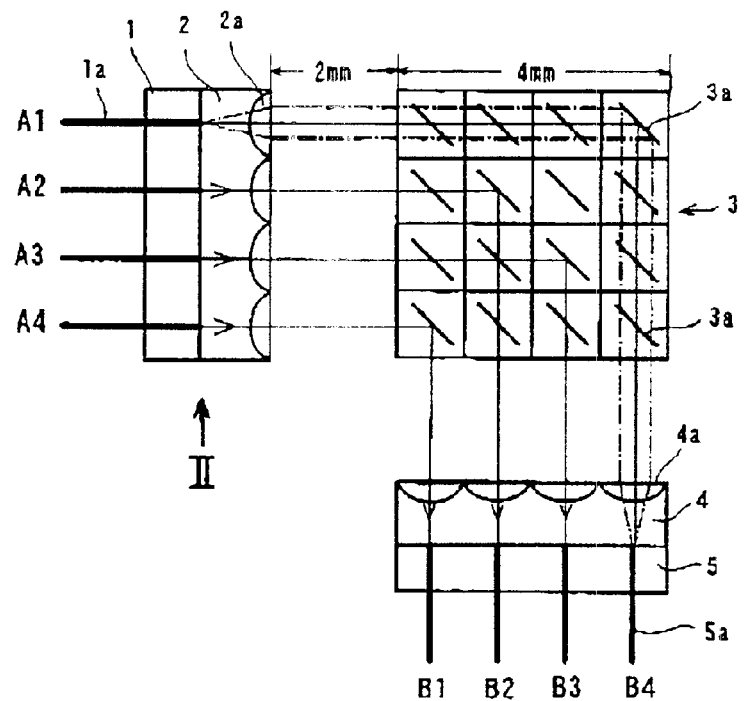
FIG. 1 shows a schematic structure of a general collimator array device.

Hereinafter, embodiments according to the present invention will be fully explained with reference to the attached drawings. Since the structure of a collimator array device according to the present invention is the same as the conventional structure shown in FIGS. 1 and 2(*a*), the explanation thereof is omitted.

Figure 2:
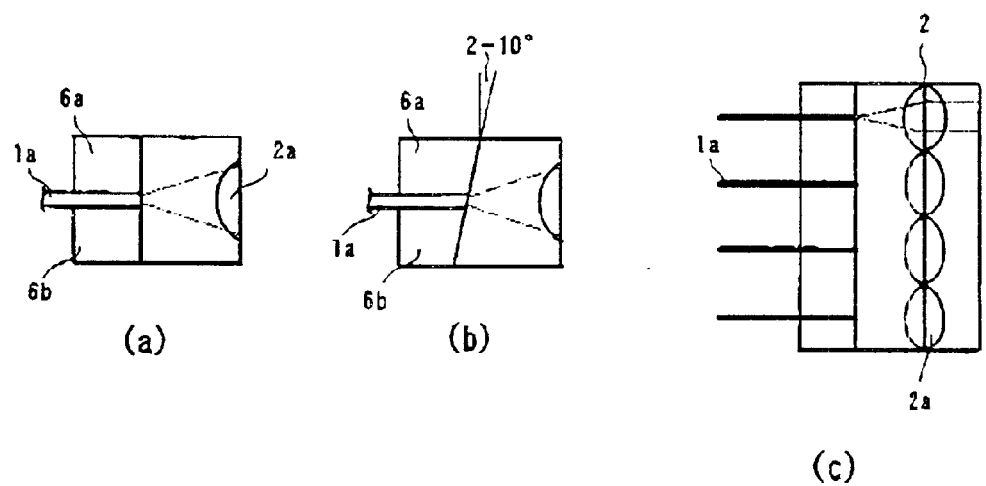
FIG. 2(*a*) is an enlarged view of the junction portion between the emitting side fiber array and the emitting side planar microlens observed in the direction designated by, FIGS. 2(*b*) and 2(*c*) shows another embodiment thereof.
Figure 3:
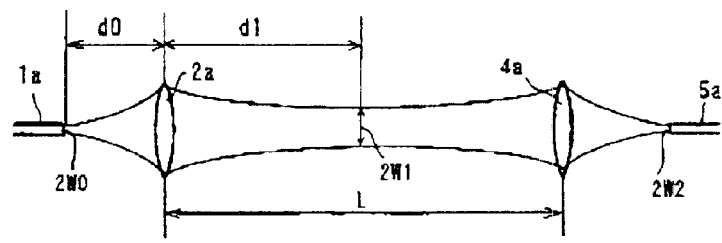
FIG. 3 explains the main feature of a Gaussian beam.

However, the junction structure between the emitting side optical fiber 1*a* and the emitting side planar microlens 2 can be improved as shown in FIGS. 2(*b*) or 2(*c*).

In the example shown in FIG. 2(*b*), the end surface of the emitting side optical fiber 1*a* and the end surface, contacting therewith, of the emitting side planar microlens 2 are polished to incline 2 to 10 degrees. With this, it is possible to prevent the reflection light caused by the slight difference in the refractive indices of the emitting end of the optical fiber and the microlens array substrate from directly going back to the fiber, and thereby the reflection noise can be reduced.

In the example shown in FIG. 2(*c*), the emitting side planar microlens 2 is comprised of two sheets of microlens array. With this, it is possible to meet the necessity of a lens having a large numerical aperture (NA). For example, when each sheet of microlens arrays has a numerical aperture of 0.2, two sheets of microlens arrays have a numerical aperture of about 0.4 in total.

The junction structure between an emitting side optical fiber and the emitting side planar microlens can be applied to the receiving side optical fiber and the receiving side planar microlens.

As mentioned above, the condition for obtaining the maximum efficiency in the optical system which is from the emitting side optical fiber 1*a* through the receiving side optical fiber 5*a* is that d1 is equal to L/2. When the width of the waist at the emitting side is designated by 2W0, the width of the waist after passing the lens is designated by 2W1, the focal length of the lens is designated by f, the wavelength is designated by $\lambda$, and the distance between the waist at the emitting side and the lens is designated by d0. The distance d1 between the lens and the waist after passing therethrough is expressed by the following equations (1) and (2). (Reference book: *Basis and Application of Optical Coupling System* (chapters three and four)" published with GENDAIKOGAKUSHA and written by Kenji KAWANO.)

$$dl = \frac{\left(\frac{\pi \omega o^2}{\lambda}\right)^2 \left(\frac{1}{f}\right) - do\left(1 - \frac{do}{f}\right)}{\left(\frac{\pi \omega o^2}{\lambda}\right)^2 \left(\frac{1}{f}\right)^2 + \left(1 - \frac{do}{f}\right)^2} \quad \text{Equation 1}$$

$$\left(\frac{\omega 1}{\omega o}\right)^2 = \frac{1}{\left(\frac{\pi \omega o^2}{\lambda}\right)^2 \left(\frac{1}{f}\right)^2 + \left(1 - \frac{do}{f}\right)^2} \quad \text{Equation 2}$$

Figure 4:
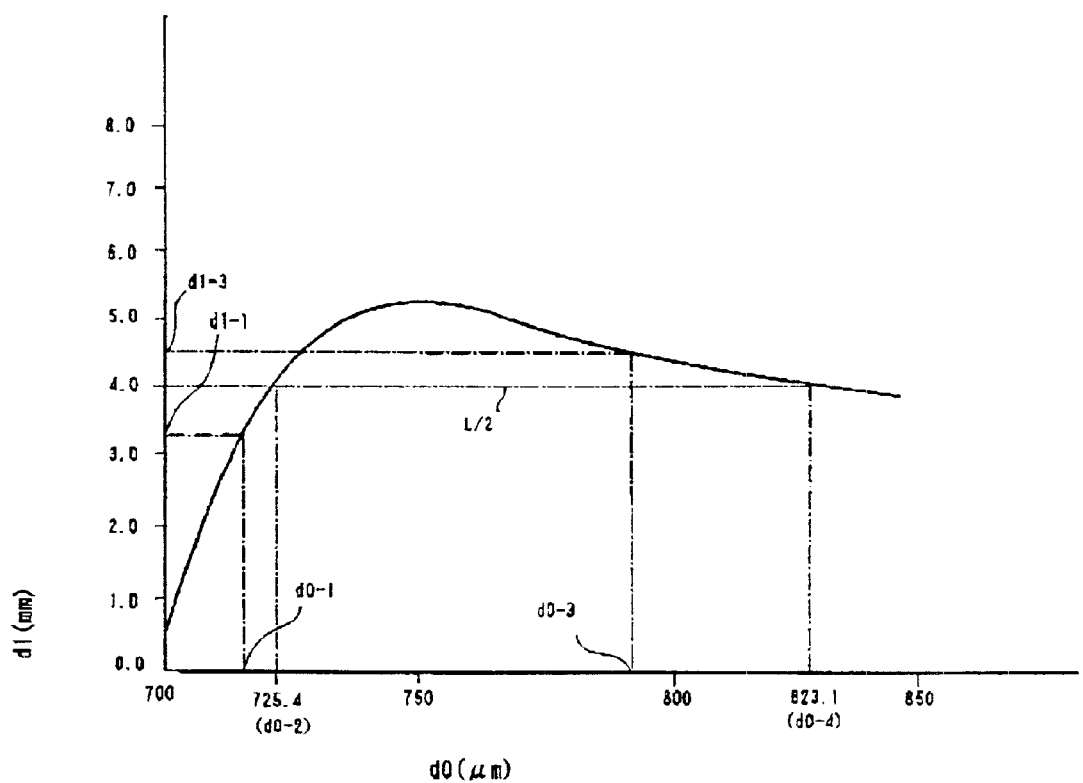
FIG. 4 is a graph showing the relationship between the distance d0 from the end surface of the emitting side fiber array through the end surface of the emitting side planar microlens and the distance d1 from the end surface of the emitting side planar microlens through the beam waist.

The result of a simulation, in which the wavelength is set at 1.55 μm, the mode field diameter of the fiber is set at 10.5 μm, the focal length of the planar microlens is set at 700 μm, and the abovementioned equations are used, is shown in FIG. 4.

Figure 5:
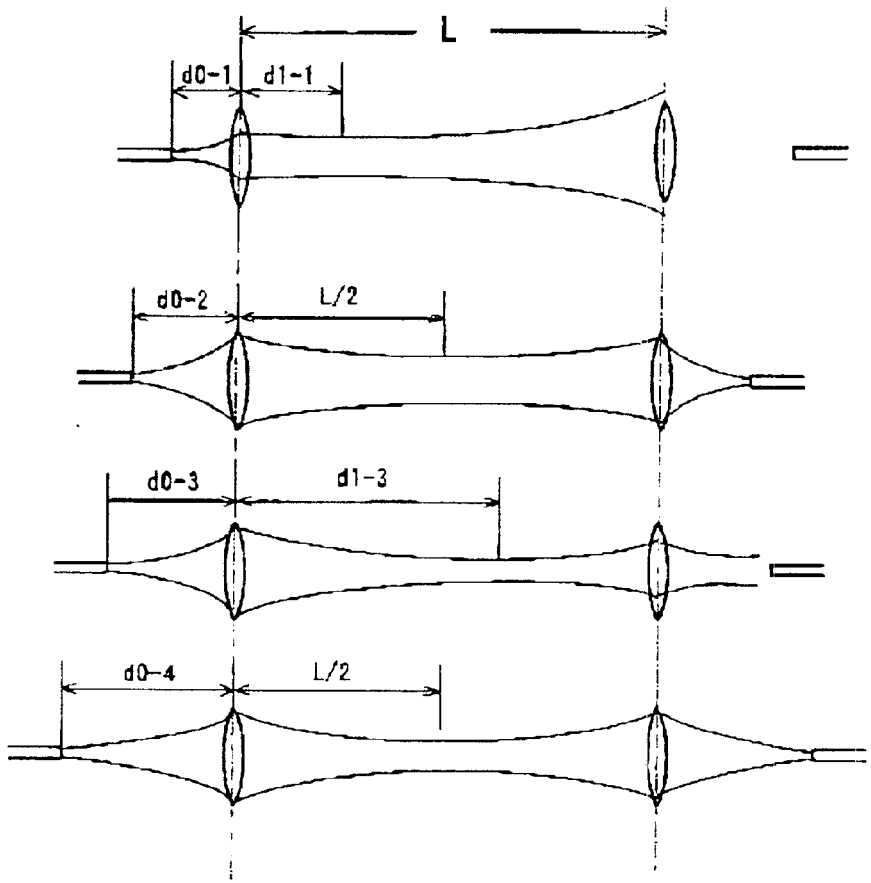
FIG. 5 explains the relationship between the distance d0 and the distance d1 shown in FIG. 4 in relation to the coupling condition.

FIG. 5 explains the relationship between the distance d0 and the distance d1 shown in FIG. 4 in relation to the coupling condition. It turns out that the distance d1 becomes larger as the distance d0 is gradually made larger from the smallest value (around 700 μm in this embodiment).

As mentioned above, it is necessary to position the intermediate waist at L/2 for the coupling condition in the collimator optical system. In this embodiment, if La is equal to 8 mm, it is necessary that d1 be equal to 4 mm, and two conditions of d0 for satisfying this are obtained from equation (1). These are d0-2=725.4 μm and d0-4=823.1 μm in FIG. 4.

As shown in FIG. 5, in a case of another value d0-1, the beam waist is positioned to the side of the emitting side planar microlens, and thereby an accurate coupling is not obtained. On the other hand, in a case of another value d0-3, the beam waist is positioned to the side of the receiving side planar microlens and thereby an accurate coupling is not obtained either. In such cases, no beam waist is formed at a receiving side fiber array the mode field diameter of which is the same as the emitting side fiber array i.e., 10.5 μm, or the width of the formed beam waist is larger or smaller than 10.5 μm, and thereby the coupling efficiency is decreased.

The insertion loss (coupling rate η) can be calculated using the following equation (3) after the width 2W2 of the waist at the receiving side fiber is obtained by applying the above-mentioned equation (2) to each of two planar microlenses.

$$\eta = \kappa \exp\left[-\kappa\left\{\frac{xo^2}{2}\left(\frac{1}{\omega o^2} + \frac{1}{\omega l^2}\right)\right\}\right] \quad \text{Equation 3}$$

In this case, $$\kappa = \frac{4}{\left(\frac{\omega o}{\omega 1} + \frac{\omega 1}{\omega o}\right)^2 + \left(\frac{\lambda Z}{\pi \omega o \omega 1}\right)^2}$$

In equation 3, Z indicates the shift of the waist position from the end surface of the receiving side fiber in the direction of the optical axis. This is also obtained by applying the above-mentioned equation (1) two times. Further, xo indicates the shift amount of the beam waist in the transverse direction.

Figure 6:
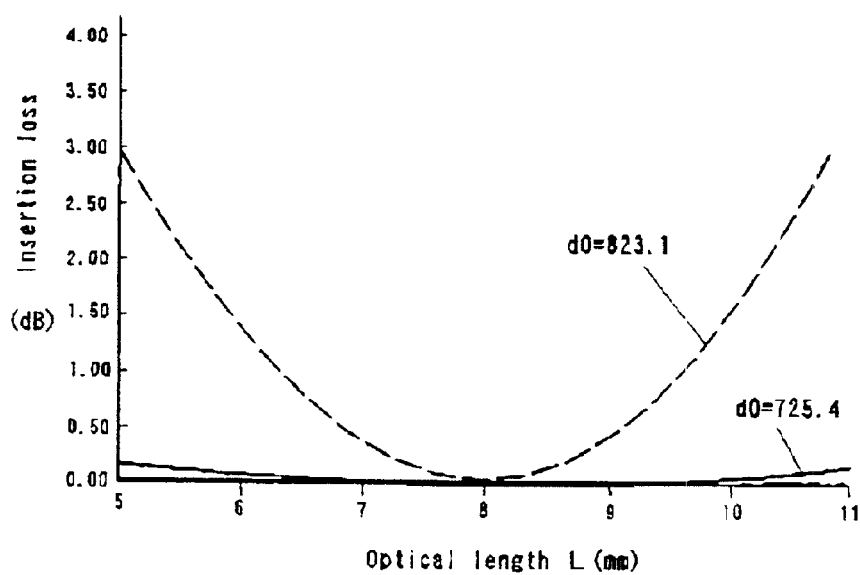
FIG. 6 is a graph showing the relationship between the variation of the optical length L and the insertion loss based on the distance d0.

The insertion loss, which is obtained by adding the variation of the optical length L to the two conditions of the distance d0 between the waist at the emitting side and the lens, using equation 3, is shown in FIG. 6. FIG. 6 shows that the smaller one of two conditions of the distance d0 is preferable for the present case.

As mentioned above, in a collimator array device having an optical switch array, the optical length L is varied depending on the combination of the emitting side optical fiber and the receiving side optical fiber. Such a variation of the optical length L causes the shift of the beam waist position of the laser beam emitted from the end surface of the receiving side planar microlens. It is difficult to completely prevent such a shift because of the structure of a collimator array device.

However, by selecting the smaller one (d0-2) of the distances which satisfy d1=L/2 i.e., 725.4 μm in this embodiment, it is possible to reduce the insertion loss due to the shift at the time of coupling.

Figure 7:
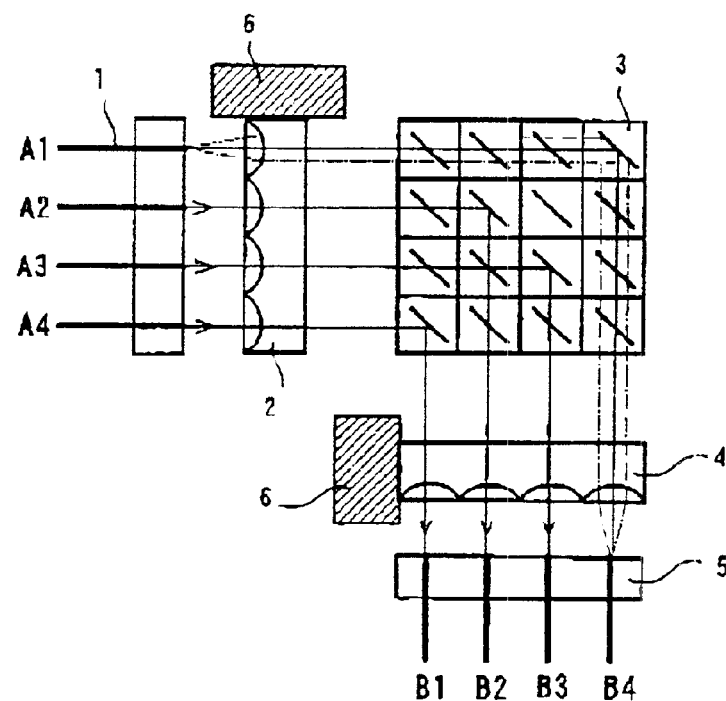
FIG. 7 shows a schematic structure of a collimator array device according to another embodiment of the present invention.

In another embodiment shown in FIG. 7, one edge of the emitting side planar microlens 2 and the receiving side planar microlens 4 is fixed with a supporting body 6. However, the other portions are not fixed so as to expand and shrink depending on the thermal variation.

As mentioned above, if the materials for the fiber array and the planar microlens are different, the linear expansivities thereof are also different. As a result, the center of the lens is shifted with regards to the optical axis.

Figure 8:
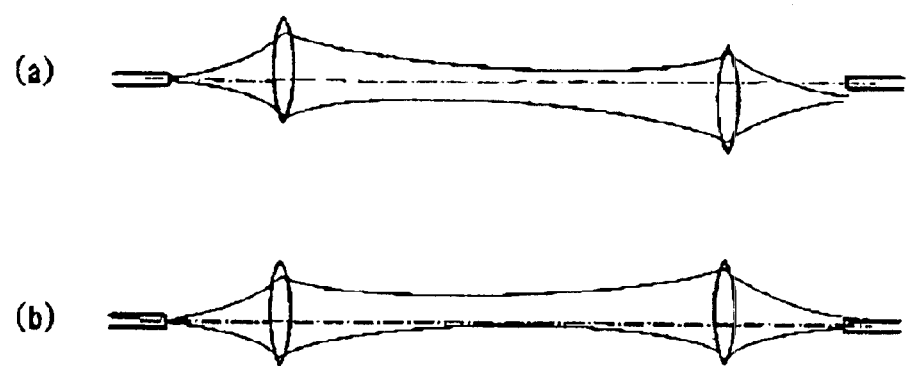
FIGS. 8(*a*) and 8(*b*) explains the shift from the optical fiber because of the thermal expansion of the planar microlens.
Figure 9:
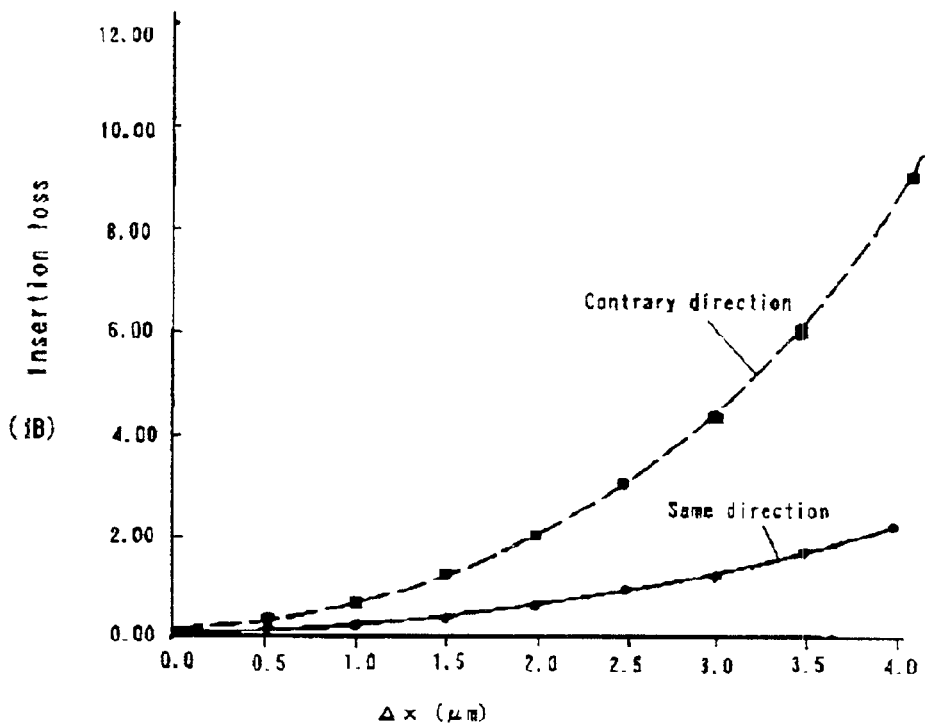
FIG. 9 is a graph showing the relationship between the direction of the shift of the emitting side microlens and the receiving side microlens and the insertion loss.

FIG. 9 is a graph showing the relationship between the direction of the shift of the emitting side microlens and the receiving side microlens and the insertion loss. If the emitting side microlens 2 and the receiving side microlens 4 are shifted in contrary directions with regards to the optical axis, as shown in FIG. 8(a), the beam waist of the laser beam emitted from the receiving side microlens 4 is greatly deviated from the end surface of the single mode optical fiber 5a of the receiving side fiber array 5. Therefore, one specific edge of the emitting side planar microlens 2 and the receiving side planar microlens 4 is fixed with a supporting body 6.

For example, one edge is pushed onto a rigid body and fixed by adhesion or fusion. The other edge is loosely supported with a soft adhesive of relatively low Young's modulus (not shown).

Figure 10:
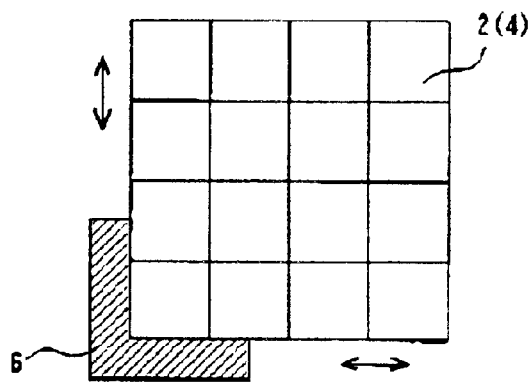
FIG. 10 shows another embodiment of a method of fixing the planar microlens.

In another embodiment of a method of fixing the planar microlens shown in FIG. 10, two adjacent edges of the emitting side planar microlens 2 and the receiving side planar microlens 4 are fixed with a supporting body 6. The other potions are not fixed, so that it is possible to expand and shrink.

In the drawings, an optical switch array is shown as an optical functional element. However, the present invention can be applied to a collimator array device in which another optical functional element for varying the optical length L is installed, for example, a demultiplexing filter or the like. It is not limited to an optical switch array.

The planar microlens array according to the present invention is not limited to one in which microlenses are formed on one sheet of substrate as a unity. It is also possible to use a microlens array which is obtained by arranging, for example, ball lenses, graded index rod lenses, aspherical lenses, or the like, based on a substrate, a holder, a housing, or the like. In such a case, a designing method according to the present invention can be applied in the same way. Also, a method of fixing a microlens according to the present invention can be applied to a microlens array together with a substrate or a holder for arranging the microlens array.

The example of the values described in the embodiment is only one example. With regards to the values of a fiber, a wavelength, the focal length of a lens, or the like, which is used in the present device, an adequate value may be respectively calculated using equations 1–3 in accordance with the description of the present specification. In such cases, the same effect can be obtained.

Further, in the above-mentioned embodiment, a planar microlens, which is a convergent lens, is used. However, it is not limited to a planar microlens. A homogenous lens such as a spherical lens; an aspherical lens, or the like; a graded index lens such as a graded index in radical direction rod lens, a graded index in axis direction spherical lens, or the like; and Fresnel lens or the like may be used.

However, by using a planar microlens, since it has lenses which are arranged on the same plane, a laborious process for arranging and fixing respective lenses can be saved. Advantageously, with regards to a planar microlens, each lens is formed with an ion exchange or a wet etching via a photomask, and thereby the arranging position of each lens has high accuracy. In addition, a planar microlens is manufactured with one process such as an ion exchange or the like, and thereby the differences in the performance of the focal length, the spherical aberration, or the like, can be greatly reduced.

According to the present invention, as explained above, there is provided a method of designing a collimator array device, comprising the steps of: calculating a mean value La of the optical length L of the laser beam which passes from an emitting side lens (a planar microlens) through a receiving side lens (a planar microlens), obtaining two values of the distance d0 between an emitting side fiber array and an emitting side lens (a planar microlens) in which the distance from the emitting side lens (a planar microlens) through the beam waist of the laser beam collimated by the emitting side lens (a planar microlens) is equal to La/2, and selecting the smaller value. As a result of this, not only an accurate coupling can be conducted, but also the insertion loss because of the variation of the optical length can be reduced as much as possible.

Further, according to a fixing method of the present invention, even if the materials for the fiber array and the planar microlens are different in a thermal expansion coefficient, it is possible to prevent the loss due to the shift with regards to the optical axis which is caused by the difference in a thermal expansion coefficient from increasing.

What is claimed is:

1. A method of designing a collimator array device in which a laser beam, having a feature of a Gaussian beam, emitted from an emitting side fiber array is collimated by an emitting side lens, the collimated laser beam is made incident upon an optical functional element and thereafter converged by a receiving side lens, and the converged laser beam is made incident upon a receiving side fiber array, comprising the steps of:

calculating a mean value La of the optical length L of the laser beam which passes from said emitting side lens through said receiving side lens;

obtaining two values of the distance d0 between said emitting side fiber array and said emitting side lens in which the distance from said emitting sidelens through the beam waist of the laser beam collimated by said emitting side lens is equal to La/2; and selecting the smaller value of said two obtained values.

2. A method of designing a collimator array device according to claim 1, wherein said emitting side lens and said receiving side lens are planar microlenses.

3. A method of designing a collimator array device according to claim 1, wherein said optical functional element varies the optical length L of said laser beam depending on the operation condition thereof.

4. A method of designing a collimator array device according to claim 1, wherein said optical functional element is an optical switch array for changing the channel between said emitting side fiber array and said receiving side fiber array.

5. A method of designing a collimator array device according to claim 1, wherein said optical functional element is a single optical demultiplexing filter or plural optical demultiplexing filters.

6. A collimator array device in which the laser beam, having the feature of Gaussian beam, emitted from an emitting side fiber array is collimated by an emitting side lens, the collimated laser beam is made incident upon an optical functional element and thereafter converged by a receiving side lens, and the converged laser beam is made incident upon a receiving side fiber array, wherein the distance d0 between said emitting side fiber array and said emitting side lens is the smaller value of two values obtained based on a mean value La of the optical length L of the laser beam which passes from said emitting lens through said receiving side lens.

7. A collimator array device according to claim 6, wherein said emitting side lens and said receiving side lens are planar microlenses.

8. A collimator array device according to claim 7, wherein one edge or two adjacent edges of said emitting side planar microlens and the receiving side planar microlens are fixed, so that said emitting side planar microlens and the receiving side planar microlens can expand or shrink in the same direction with regards to the optical axis in a case where thermal variation occurs, and the other portions are not fixed.

9. A collimator array device according to claim 7, wherein the end surface of said emitting side optical fiber and the end surface, contact therewith, of said emitting side planar microlens are polished to incline 2 to 10 degrees.

10. A collimator array device according to claim 6, wherein said optical functional element varies the optical length L of said laser beam depending on the operation condition thereof.

11. A collimator array device according to claim 6, wherein said optical functional element is an optical switch array for changing the channel between said emitting side fiber array said receiving side fiber array.

12. A collimator array device according to claim 6, wherein said optical functional element is a single optical demultiplexing filter or plural optical demultiplexing filters.

* * * * *